Patented Jan. 15, 1935

1,988,007

UNITED STATES PATENT OFFICE 1,988,007

DENATURED ALCOHOL AND PROCESS OF PRODUCING THE SAME

William H. Hampton, Berkeley, Calif., assignor to Standard Oil Company of California, San Francisco, Calif., a corporation of Delaware No Drawing. Application January 12, 1931,
Serial No. 508,369

17 Claims. (Cl. 202—77)

This invention relates to a process for denaturing ethyl alcohol and refers to the ethyl alcohol produced from the process. In particular, the invention relates to the use of a denaturing material derived from acid sludges resulting from the treatment of petroleum and like oils with sulfuric acid.

Alcohol denaturants are materials which, when added to alcohol, render it unfit for use as an intoxicating beverage. Alcohol to which such materials have been added is free of tax and is solely for use in the arts and industries. In a very limited number of cases the permissible denaturing materials are such as to allow the sale or use of the alcohol without permit or bond, within certain limitations:

Alcohol so denatured is definitely toxic; it cannot be used internally and is injurious if used externally. In certain other cases ethyl (grain) alcohol is treated with such denaturing materials as to permit its use in a greater number of specialized arts and industries than could be accommodated by the more completely denatured alcohols. The character of these latter denaturants is such that the alcohol may be sold, possessed, and used only pursuant to permit and bond. The materials comprising these special denaturants are of various types: all of them are designed to render the alcohol unfit for consumption as a beverage, but so chosen as not to harm or react deleteriously in the processes or producers of the various useful arts and industries. Thus some, without being definitely toxic, render the alcohol unpalatable to the taste, or nauseating upon consumption; some are definitely toxic, but in certain instances these toxic materials might be removed from the alcohol by relatively simple chemical or physical means by unscrupulous persons.

For the accommodation of certain of the specialized arts and industries the denaturant may be so mild in its effectiveness as a deterrent to consumption that its use is permitted only after the closest scrutiny by the constituted authorities or to the standing and responsibility of the applicant, the character of the premises and the detailed and approved description of the process for whose use it is desired.

Thus, although the primary requirement of the denaturing materials is merely that they shall render the alcohol unfit for use as a beverage, the practical difficulties attending their discovery and acceptability are many, and obvious.

The novel denaturing material described herein is possessed of the requirements and properties of the ideal to a remarkable degree. These qualifications are set forth in detail below.

The present invention embodies the discovery that certain oils or parts of the oils which are derived from acid sludges resulting from the treatment of petroleum and like oils with sulfuric acid possess certain excellent and exceptional properties when used in a material for denaturing ethyl alcohol. Some of the advantages of the use of this type of denaturing material for alcohol are set forth hereinafter.

Upon the addition of this compound or series of compounds to alcohol, the taste and odor imparted act definitely and positively to deter the most incorrigible or ambitious from its consumption as a beverage, even after extreme dilution; nor will flavoring materials, such as the essential oils, etc., which might be added in an attempt to mask or minimize the taste and odor so imparted, act to render such denatured alcohol palatable or fit for beverage purposes. As will be brought out below, this denaturing material may be subjected to a purification or refinement, before its admixture with alcohol, whereby certain of the odor-imparting constituents may be decreased in amount and there remain principally, as deterrents to consumption, the taste-imparting constituents. By this means the usefulness of the material is enlarged in scope, to render it acceptable in certain arts and industries in which the more disagreeable odor might be prohibitive. It should be stated, however, that the decrease in amount of these odor-imparting constituents does not in any sense render the alcohol so denatured palatable or acceptable for beverage purposes, inasmuch as the principal deterrent effect is brought about by the violation of the sense of taste, and is merely augmented by that of odor.

It has been found very difficult, or impossible, to adequately describe the taste imparted by this material in terms such that it may be recognized. The taste and odor of the compounds comprising it are sufficiently beyond the normal experience as to require new words, new phrases, in the vocabularies even of the chemist and the pharmacist. Suffice it to say, therefore, that these tastes and odors are distinctive and inherently characteristic of the chemical ingredients comprising the mixture. The taste imparted by this denaturant is extremely persistent. Thus it is disagreeably noticeable, and calls itself forcibly upon the attention, for a period of hours subsequent to its imbibition.

The denaturing material herein described is not miscible in all proportions with alcohol; the amounts necessary to effectively denature are, however, very small, and its solubility in alcohol need hardly be brought to question. Thus in one of the examples shown in this specification, 35 per cent by volume is soluble in 90 per cent alcohol; in this particular case only about 1 per cent by volume of the material is sufficient to act as an effective denaturant.

This material, once added to alcohol, in whatever proportions or amounts consistent with its purpose, is difficult or impossible to remove. It consists of a series of chemical compounds whose boiling points may extend from below that of the constant boiling alcohol-water mixture to any desired point above it; this boiling point range may be varied at will, and is subject to close control and duplication during its process of manufacture and refinement. Thus the material cannot be removed, after addition to alcohol, by the ordinary processes of fractionation or rectification.

Chemically, it is very inert. Thus no substantial removal may be effected upon refluxing alcohol to which it has been added with dilute acids or with dilute alkalis. Very strong sulfuric acid, upon such refluxing, dissolves this denaturant; it will be noted, however, that such refluxing with very strong acids, as sulfuric, effects such a reaction with the alcohol itself that dilution and distillation are necessary for its recovery, and that during such alcohol recovery, by distillation, the denaturant is freed from the acid solution simultaneously with the alcohol, and passes from such recovery system together with the recovered alcohol, and is inseparable from it.

No ordinary physical means is capable of separating this material from alcohol to which it has been added. In this connection distillation, with fractionation or rectification, has already been mentioned. Further, the freezing points, or the temperatures at which the constituents of this material solidify, are so low that the refrigeration of alcohol denatured by its addition does not cause its separation as solid or semi-solid matter capable of removal by settling and decantation, or by filtration, or by clarification as by centrifuging, etc. Further, a large amount of this denaturing material remains in solution even after extreme dilution of the alcohol with water. Further, while certain of the odorous constituents may be somewhat decreased in amount by the adsorbing effect of certain agents, as the actified charcoals, and gels, as silica gel, or by treatment with various clays, when such treatments or refinements are carried out before admixture with the alcohol, the removal of the taste-imparting constituents, which act as the principal deterrent to consumption, is by no means affected by such agents. Further, it is completely volatile, and leaves no residue upon evaporation.

Thus, it may be readily seen, that once added to the alcohol to be denatured, this material is practically impossible to remove from it, either chemically or physically.

In addition to these qualifications, this material is non-toxic in the amounts necessary for all ordinary denaturing purposes, although, upon the consumption of considerable quantities, it may be nauseating; nor is it irritating to the skin. Further, but extremely small quantities or proportions are necessary to effectively render alcohol denatured with it unfit for consumption as a beverage, less than one per cent by volume of the preferred materials being sufficient for all ordinary purposes.

The wide utility of such a denaturant is at once apparent. Thus, physically and chemically inert as it is, it finds uses of a great variety throughout the arts and industries in which alcohol is necessary or desirable as a commercial solvent. It may, for example, be used in lacquer solvents and thinners, since it leaves no residue upon evaporation. It may be used in the manufacture of the ethyl esters, such as ethyl formate, ethyl acetate propionate, lactate, palmitate, etc. since, upon hydrolysis of such esters, this denaturing material remains in alcohol solution, and is not separated from the alcohol by solution in the organic acids resulting upon the hydrolysis. For use as denaturant of alcohol to be used in automobile radiator anti-freeze mixtures it is, of course, ideal, particularly after removal of some of the malodorous constituents.

It could not, obviously, be used in the preparation of medicaments in general.

The foregoing description has indicated the qualifications and wide utility of this denaturing material. The following descriptions set forth the several methods of its manufacture, and describe more definitely its chemical and physical characteristics.

The material comprising this denaturant is derived from the sludges resulting upon the treatment of petroleum and like oils with sulfuric acid, whenever such treatment removes measurable amounts of the sulfur bodies originally contained in the said petroleum and like oils, and consists in the oily components, or parts of the oily components, of the said sludges after their separation from the acids. The peculiar value as alcohol denaturants of the oily components, or parts of the oily components, of the said sludges, resides principally in their content of organic sulfur bodies, and any sludge or acid extract which upon hydrolysis or distillation yields an oil containing such organic sulfur bodies is a proper source for the manufacture or preparation of the denaturing material described herein.

Petroleum and like oils, as for example the shale oils and coal tars, or their various distillates, or the distillates, produced by the pyrogenic conversion of higher-boiling fractions or residues to lower-boiling fractions, as in the so-called "cracking" operations, are commonly subjected to treatment with sulfuric acid before their marketing and their commercial or domestic utilization. The sulfuric acid treatment to which they are so subjected varies widely as to the amount and strength of the acid used, and is determined by the character of the oil or distillate and by the refinement or purification considered necessary or desirable for the use to which the various finished products will eventually be put. In a large number of cases this treatment is designed to reduce the sulfur content of the oil; in certain other cases, it has, in addition to the purpose of sulfur reduction or removal, that of improving the so-called burning qualities of the oil, as the illuminating oils; in other cases it may be designed to remove various unstable and easily polymerizable or oxidizable compounds or bodies, as in the treatment of certain highly cracked naphthas, or in the treatment of motor benzols derived from coal tar; in still other cases it may be merely for the purpose of improving the color and appearance of certain oils, as in the treatment of certain straight-run gasolines, petroleum thinners, etc. But for whatever purpose such sulfuric acid treatment be designed, it is true that in practically all cases sulfur-containing bodies or compounds are removed from the oils or distillates and pass into sulfuric acid solution or combination to a greater or less extent, depending upon the character of the oil and upon the amount and strength of the acid used, as aforesaid.

It is the practice in the industry to return these acid sludges to recover a portion of their acid content.

These processes are generally and preferably, though not invariably, hydrolyzation processes, by means of which the hydrocarbon and sulfur-containing compounds or bodies are freed from solution in or from combination with the acid, and may be separated, to a greater or less degree, from it, after which the acid may be concentrated, if necessary or desirable, for re-use. Thus in the general and preferable cases it is proper to speak of the hydrocarbon and sulfur-containing material so separated from the acid sludges as oils from hydrolyzed sludge, even though, in certain cases, the crude material so separated may be extremely viscous, and approach tar or asphalt in appearance and consistency. These oils recovered from the acid sludges have heretofore been commonly burned as fuel, although various attempts have been made to realize some value from certain of them as solvents, etc.

The novel denaturant described herein is preferably derived from the oily components of these acid sludges, after the separation of the oily components from the acidic components of the said sludges.

In effecting the separation of the hydrocarbon and sulfur-containing compounds or constituents from the acid contained in these sludges, various processes and methods are employed, of which several will be enumerated.

Although not a preferable method, mere distillation of the sludges is sufficient to effect some separation of the oily constituents from the acid. The temperatures necessary to bring this about at atmospheric or even at reduced pressures, without dilution of the sludge with water are, however, sufficient to cause decomposition and reduction of a considerable part of the acid, and polymerization and oxidation of the oils. Thus the oils distilled are of higher boiling point and are less in amount than when obtained by dilution and hydrolysis; also, a considerable amount of $SO_2$ and of $SO_3$ is removed during the distillation, and are condensed or recovered with the oils. Moreover, the acid remaining in the still is seriously contaminated with carbonaceous material, both soluble and insoluble in it, which brings about further decomposition or reduction and loss of acid upon its further concentration for re-use. For these reasons it is preferred to dilute most of the sludges with water, and to effect what may properly be called a hydrolysis of the sludge. Some sludges may be hydrolyzed by the mere addition of water, without the application of external heat; others, however, require heat. Some sludges, for proper hydrolysis, require heating above the boiling point of the acid produced, thus necessitating the use of closed systems and pressures above atmospheric in order that the desired temperatures may be reached. In all of these methods or variations of the hydrolyzation of the sludges the acid and tar or oil are caused to separate into two layers and may be recovered separately. The upper or oily layer constitutes the source of the preferred denaturant described herein, the denaturing material being purified or refined, if necessary, as will be described below.

In addition to the petroleum oils and distillates, shale oils or their distillates are commonly subjected to treatment or refinement with sulfuric acid, as are also certain of the more volatile coal tar distillates, such as those used for the manufacture of motor benzols, and solvents and thinners: the sludges resulting from such acid treatments constitute a further source of the denaturing material described herein. In the case of these oils it is customary to precede the ordinary treatment with relatively strong acid by a treatment with a caustic alkali and with relatively weak acid, as 50 per cent or less $H_2SO_4$: by these means the removal of the comparatively large amounts of phenols and of nitrogen bases present in these oils are substantially completely effected, without, however, the removal of a substantial amount of the organic sulfur compounds; without the prior weak acid wash the ordinary sulfuric acid treatment removes the nitrogen bases from the oils. Upon hydrolysis of the resulting sludges these nitrogen bases ordinarily remain in the acid layer, and do not to any substantial extent pass into the tar or oil layer; their presence in the acid layer, however, lowers its value for re-concentration and re-use. The small quantities of the nitrogen-containing bodies that do appear in solution in the oil impart a characteristic and pungent odor to the denaturing material derived from it; this may be removed, if desirable, by further washing of the denaturant with weak acid solutions.

Thus the sources of this denaturant are several and various, and, since variable amounts and strengths of sulfuric acid may be used upon a single oil or distillate, as determined by the use to which the said oil, after refinement, may ultimately be put; and since various oils and distillates may be subjected to such variable treatments, it will be seen and appreciated that the acid sludges and extracts resulting from such treatments, and the oils separated from these sludges and extracts during the recovery of the acid from them, will be widely variable in their physical characteristics and in the amounts and proportions of their chemical constituents. It may be well to note in passing, however, that if a denaturant of more or less or even of exactly similar qualities and characteristics is desired, from time to time, or if denaturing materials of different qualities and characteristics are necessary or desirable, for different purposes, or for use in various of the arts and industries, these requirements may be perfectly met in each case: on the one hand similar acid treatments, carried out on similar oils or distillates, will produce similar sludges, and these sludges, upon separation of their acidic and their non-acidic components, will produce oils from which similar or identical materials, for use as denaturants, may be produced; on the other hand, dissimilar materials, for use as denaturants of alcohol which may be used for widely different purposes, may be produced from the sludges or extracts resulting from the use of different amounts of acid upon the same oil or distillate, or from the use of the same amounts of different strengths of acid upon the same oil or distillate, or from the use of the same amount and of the same strength of acid upon oils or distillates of different sources or of different boiling point ranges or of different sulfur contents; etc.

The utility of these oils, separated from the acid sludges or extracts as described above, as denaturing materials or as materials from which denaturants may be produced, is dependent upon the inherent chemical characteristics and qualities of certain of their components, notably the large proportions of organic sulfur compounds contained in them. While most of these organic sulfur compounds are believed to be organic sulfides of the cyclic type, other organic sulfur compounds may be present, such as aliphatic sulfides, disulfides, polysulfides, mercaptans and thiophene homologs. The proportion of each of these several series, or of the individual members within any one of the several series, cannot be set down, for two reasons: no known physical or chemical methods have thus far been worked out which serve to identify precisely the individual constituents of such complex mixtures, except in a very few of the simple cases, as for example the lower mercaptans; further, the proportions of the several series of compounds or of the individual members of any series will obviously vary widely as a result of the nature of the original treatment upon the oils or distillates. It will be sufficient to note, therefore, that these oils are all characterized by the presence of relatively large amounts of organic sulfur bodies, and that the qualifications possessed by the denaturing material derived from the sludges and extracts herein described reside largely in the inherent chemical and physical characteristics of these sulfur bodies.

In addition to these sulfur compounds there may also be present hydrocarbon bodies, either soluble as such in the acid, upon the original acid treatment of the petroleum or like distillates, which are liberated as oils upon separation of the acid by hydrolysis of distillation; or as polymerization products; or by mere entrainment in the sludge during the treatment, etc. Various hydrated products, particularly alcohols and aldehydes, may also in certain cases be present, resulting upon the treatment of those oils or distillates containing considerable quantities of unsaturated or olefinic hydrocarbons, such as the "cracked" or pressure distillates.

In most cases it has been found desirable to subject these oils to a refinement or purification before their use as denaturants. As has already been pointed out, certain of them may resemble tars or asphalt in their appearance and consistency. In these cases it is preferable to subject the material to a distillation by any of the well-known methods, by which the lower-boiling or other desirable constituents may be removed and condensed; obviously such lower boiling constituents are more widely useful as a denaturant than would be the crude higher boiling material. Obviously, too, the separation of these desired constituents may be brought about by fractional distillation and condensation during the continuous retorting of the acid sludges. Thus the boiling range of the denaturing material may be controlled at will, and may be kept constant or allowed to vary, as required. It is apparent that the yield of suitable material for alcohol denaturants will be relatively low when derived from sludges resulting upon acid treatments of the heavier or high-boiling oils, and higher when derived from sludges upon acid treatments upon the lighter or low-boiling oils or distillates, as the gasolines, naphthas and kerosenes. In addition, the sulfur content of the oils derived from these latter sludges is generally higher than that of the oils derived from treatments upon the heavier oils. It is apparent also that those acid treatments removing the greatest amounts of organic sulfur-containing materials will produce sludges which upon hydrolysis or distillation yield more potent denaturants than those in which the sulfur removal is but little. For these several reasons the oils obtained from the hydrolysis of the gasoline, naphtha and kerosene sludges constitute the preferred source of this novel denaturing material.

Inasmuch as this material has been separated from acid, it is usually necessary to neutralize with an alkali or base the mineral acids, as sulfuric or sulfurous, which may be present at the time of separation; if desirable, such a neutralization may economically be preceded by extraction of a large amount of the mineral acids with water. Thus the possible corrosion of pipes and containers, etc. and the possible future deterioration of the oils, is stopped.

If a denaturant with but relatively little odor is desired, in which the taste-imparting constituents only comprise its desirable qualities, certain other treatments or processes of refinement may be carried out. Of the sulfur compounds contained in this material, those which possess the strongest and foulest odors are the mercaptans; certain of the lower-boiling members of this series may be removed by treatment with caustic alkalis; substantially all of the mercaptans, and consequently a considerable proportion of the foulest odorous principles, may be removed by adsorption upon contacting with various adsorbing agents, as silica gel, the actified charcoals, certain of the contact clays, etc., or by conversion of the mercaptans to disulfides as by any of the well-known methods of "doctor" treatment. Methods of refinement such as these have no appreciable effect upon most of the taste-imparting constituents of the denaturing material, since the taste-imparting characteristics have been found to reside principally in those sulfur compounds inert or not reacted upon or removed during the types of treatment outlined above.

The color of the denaturing materials, after suitable separation and recovery of the lower-boiling fractions, is from a light straw to a dark brown; if desirable, the color may be improved by treatment with any of the usual decolorizing agents, as for example the contact clays.

For example the sulfur content of these denaturants may be from as low as 2 per cent to as high as 30 per cent; ordinarily the per cent sulfur will not be above about 18 per cent, and satisfactory denaturants may be found containing only from 2 to 5 per cent sulfur. Again, it may be desirable for some purposes to dilute the denaturing material itself, before addition to the alcohol, with neutral substances, such as gasoline or other relatively light refined oils.

The following examples, therefore, will be understood to be merely specific, and in no sense representative or typical of the entire range of suitable denaturing materials. As has been brought out above, material suitable for use as alcohol denaturants may be derived from any of the sludges or extracts resulting upon the treatment of petroleum and like oils or distillates with sulfuric acids, whenever such treatment produces a sludge which upon hydrolysis or distillation yields an oil containing an appreciable content of organic sulfur compounds, and this specification should be so construed.

Particular examples of the production of the denaturing materials described herein are set forth below.

Example 1

| Acid treatment of oils | Calif. straight run gasoline | $SO_2$-treated lamp oil distillate |
|---|---|---|
| Sulfur in crude distillate, percent | 0.06 | 0.045 |
| Sulfur in treated distillate, percent | .03 | .02 |
| Strength acid used, percent $H_2SO_4$ | 98.0 | 103.4 |
| Amount acid used, lbs/gal. oil | 0.015 | .075 |
| Amount sludge produced, gals/lb. acid | .125 | .10 |

Hydrolysis of sludge

A mixture of equal parts of the above sludges was hydrolyzed in a continuous retort at 290° F. and under 20 pounds gauge pressure. A total acid tar yield of 45 per cent, on the basis of the sludge charged, was obtained. From the acid tar a yield of 25.5 per cent of denaturant was separated (or a yield of 12 per cent on the basis of the sludge retorted) having the following characteristics:

| | |
|---|---|
| Sulfur, per cent | 10.5 |
| Specific gravity | .8607 |
| A. S. T. M. dist'n st | 161° F. |
| 20 | 283 |
| 50 | 318 |
| 90 | 367 |
| E. P. | 413 |

Example 2

| Acid treatment of oils | Crude pressure naphtha | Crude kerosene distillate |
|---|---|---|
| Distillate treated | | |
| Sulfur in crude distillate, percent | 0.43 | 0.30 |
| Sulfur in treated distillate, percent | .35 | .06 |
| Strength acid used, percent $H_2SO_4$ | 98.0 | 103.4 |
| Amount acid used, lbs/gal. oil | 0.20 | 0.5 |
| Amount sludge produced, gals/lb. acid | .150 | .163 |

Hydrolysis of sludge

These sludges, also in equal proportions, were retorted as in Example 1, but at 340° F. and under 60 pounds gage pressure. A total tar yield of 60 per cent was obtained. Of this, 14.2 per cent, or 8.5 per cent on the basis of sludge retorted, was obtained as denaturant, with the following characteristics:

| | |
|---|---|
| Sulfur, per cent | 9.5 |
| Specific gravity | .8702 |
| A. S. T. M. dist'n st | 122° F. |
| 20 | 302 |
| 50 | 362 |
| 90 | 442 |
| E. P. | 476 |

Example 3

An oil similar to that obtained in Example 1 was treated with a contact clay to improve its color and to remove a part of its most malodorous constituents. The characteristics of the refined denaturant were as under 3a below. This refined material was also diluted with an approximately equal quantity of refined California kerosene; the diluted product appears as under 3b below.

| | 3a | 3b |
|---|---|---|
| Sulfur | 9.77 | 5.01 |
| Specific gravity | .8602 | .8363 |
| A.S.T.M. dist'n st | 175° | 227 |
| 20 | 280 | 318° |
| 50 | 316 | 365 |
| 90 | 359 | 458 |
| E.P. | 406 | 500 |
| Solubility in 90% alcohol | 13.5 cc. | 12.0 cc. |
| Solubility in 95%–96% $H_2SO_4$ | 16.5 cc. | 13.5 cc. |
| Iodine value | 45.1 | 32.9 |

The distillation range is as determined by Method 100.13, U. S. Government Master Specification, Bureau of Mines Technical Paper 323 C.

Solubility in 90% alcohol and in 95–96% $H_2SO_4$ is given as the volume of the respective reagents when 10 cc. is shaken with 10 cc. of the denaturant in a stoppered cylinder.

The iodine values were obtained by the standard test for fatty oils using Wij's solution.

Any or all of the foregoing denaturing materials may be added to alcohol or to the ethyl esters for the purpose of denaturing the same. There is no very definite and quantitative method of determining exactly how much of the denaturing material is necessary, as the only means of judging its effectiveness is by the taste and other characteristics it imparts which make the alcohol unsatisfactory when used in beverage mixtures, and it will be realized that a denatured alcohol sufficiently unpalatable to deter the ordinary imbiber may not suffice to deter the most incorrigible. It has been found, however, that a material such as is described above as Example 3—b, when used in the proportions of from one to two per cent by volume of the alcohol, when the alcohol present is calculated as 95 per cent alcohol, will render such alcohol definitely and positively unpalatable to most individuals.

When using a denaturant such as is described above as Example 3—a, approximately half the amount shown for Example 3—b will be sufficient. In the denaturing of the ethyl esters, as for example in the case of ethyl acetate, amounts as low as one-eighth of one per cent by volume of the material described as Example 3—b may be sufficient.

It has already been noted in the description of this denaturing material that a large amount of it remains in solution in the alcohol even after extreme dilution with water. When the denaturing material is diluted with a hydrocarbon diluent such as the kerosene embodied in the denaturant described above as Example 3—b, a cloud or suspension appears in the denatured alcohol when it is diluted with water. Thus if a 95 per cent alcohol containing about one and one-half per cent of the denaturant 3—b is diluted with water, the diluted mixture becomes cloudy when the strength of the alcohol is about 75 per cent. This is primarily due to the fact that kerosene is itself relatively insoluble in dilute alcohol. If a clean and homogeneous solution containing one and one-half per cent of a denaturant is desired, still using a hydrocarbon diluent, the kerosene embodied in denaturant 3—b may be substituted by a hydrocarbon diluent which is more soluble in dilute alcohol than is kerosene. Such a diluent is found in the mixture of unsaturated and aromatic compounds extracted from certain kerosene and similar distillates by extraction with liquid sulfur dioxide. A denatured alcohol containing about one and one-half per cent of a denaturant such as Example 3—b, but containing such an SO₂ extract in place of kerosene, may be diluted to about 65 per cent alcohol before the mixture becomes cloudy. A coal tar distillate or fraction containing large amounts of aromatic compounds such as xylene, for example, is more soluble in dilute alcohol than is kerosene or the SO₂ extract from the treatment of kerosene distillates with liquid SO₂ and hence such aromatic-containing distillate or compounds constitute an acceptable diluent for this denaturing material. Thus, the preferred diluent is an oil containing unsaturated constituents, using the term unsaturated in the sense of including not only olefinic constituents but also the aromatic constituents. It will be obvious that any such diluent is suitable, and that the prime requisite of such diluent is its solubility in dilute alcohol as well as its simplicity with the denaturing material itself. If a denaturant such as is described as Example 3—a is employed, no cloud appears until the alcohol is diluted to about 55 per cent. In all of these cases it appears that the most saturated constituents come first out of alcohol solution when the alcohol is diluted, and it is not to be inferred that when and if a cloud appears in the denatured alcohol the alcohol ceases to be properly and effectively denatured. On the contrary, a sufficient amount of the constituents which are effective in rendering the alcohol unpalatable, that is, the various sulfur-containing bodies, remain in solution throughout the entire process of the dilution, even when the dilution is carried to extreme limits, to maintain the diluted alcohol positively and permanently unpalatable for use in a beverage mixture. In practice, it has been found convenient to use kerosene or a similar material as a diluent when the denaturant is to be used for the denaturing of ethyl acetate or the ethyl esters in general, and to employ an SO₂ extract or a material containing larger amounts of unsaturated and/or aromatic compounds as diluent when the denaturant is to be used in denaturing ethyl alcohol. The presence of such a diluent, while not always a necessary embodiment of the denaturant of the invention, has been found very convenient in practice, as it enables the user of the denaturant to control very precisely the amount of the sulfur bodies to be added to the alcohol or the esters to be denatured.

It is apparent that such a denaturing material may be used in many of the arts and industries not heretofore specifically mentioned. It has been found particularly advantageous, for example, in the denaturing of fats and oils whose use as edible products or as raw materials for the preparation of edible products it is desired to prevent. For use as a denaturant in such fats and oils, as animal or vegetable fats and oils, it is preferred that a product of higher boiling point range than that described for the denaturing of alcohol or ethyl esters be used. As has been described above in this specification, the materials comprising this denaturant possess a wide range of boiling points, and it is necessary only to select such a fractional part as suffices for the particular purpose. In this case it is preferred that a cut of somewhat higher boiling range be used, for example, one with an initial boiling point of 400° or 450° F. The end point of such a denaturant is of but little consequence, since these fats and oils are not ordinarily distilled to dryness in the industries, and the high initial boiling point is chosen merely to insure that a substantial amount of the denaturant shall not be removed by simple distillation. It has been found convenient in the denaturing of these fats and oils to employ as a diluent, when a diluent is desirable, a mineral spindle oil or light petroleum lubricating oil, such, for example, as an oil of viscosity 100–150 seconds Universal Saybolt viscosity at 100° F. and a flash point of 300–350° F. A denaturant suitable for this purpose may consist of 1–4 per cent of the oil from hydrolyzed or distilled sludge and 96–99 per cent of such a mineral oil diluent, and may be used to denature these fats and oils by the addition of one or more parts of the denaturant (diluted) (as described) to 1000 parts of the fat or oil.

While the particular denatured alcohol, denatured ethyl esters and denatured fats and oils herein described and the processes of producing the same are well adapted to carry out the objects of the present invention, it will be understood that various changes and modifications may be made without departing from the spirit of the invention, and the invention is of the scope of the appended claims.

I claim:

1. A denatured alcohol containing oils derived from the acid sludge formed during sulphuric acid treatment of hydrocarbon oil, said oils containing organic sulphur bodies and being substantially free of toxic bodies such as alkaloids.

2. A denatured alcohol including as a denaturant oils derived from acid sludges formed during the sulphuric acid treatment of petroleum oils, such denaturant containing a material content of sulphur bodies and being substantially free of toxic bodies.

3. A denaturant comprising the oils derived from the acid sludges formed during sulphuric acid treatment of lower boiling point petroleum oils containing organic sulphur bodies, denaturant oils including substantial amounts of sulphur bodies and possessing a persistent taste therefrom, said denaturant oils being non-toxic in amounts necessary for use as denaturant and being capable of evaporation when placed in alcohol without leaving a residue, and being inseparable from said alcohol by ordinary distillation, by ordinary rectification, by ordinary refrigeration and by ordinary filtering agents.

4. A denaturant for alcohol comprising oils derived from the sulphuric acid treatment of kerosene or gasoline fractions of petroleum, said denaturant oils containing organic sulphur bodies having a sulphur content of 2 to 30%, said denaturant oils having a boiling point range such that they can not be removed from alcohol by distillation, said denaturant oils also being inseparable from alcohol by refrigeration and by filtering agents, said denaturants being further free of toxic materials such as alkaloids or other nitrogen bases.

5. A denaturant for alcohol, comprising oils derived from the sulphuric acid treatment of low boiling point fractions of petroleum which contain sulphur, said denaturant oils containing organic sulphur bodies having a sulphur content of 2 to 30%, said denaturant oils being rectified from the high boiling tar resulting from the sulphuric acid treatment and having a boiling point range such that they cannot be removed from alcohol by distillation or by refrigeration or filtering agents, said denaturants being free of toxic materials such as alkaloids or other nitrogen compounds.

6. A denaturant comprising the oils resulting upon the distillation of acid sludges formed during the treatment of petroleum or like oils with sulphuric acid, the denaturant when freed of diluent possessing a sulphur content of between 2 and 30% sulphur.

7. A process of producing a denaturant, which comprises treating oil containing sulphur bodies with sulphuric acid to form acid sludge, hydrolyzing the acid sludge to separate the oil from the acid, subjecting the oil to fractional distillation to separate therefrom a fraction having an end boiling point not substantially above 500° F. for use as a denaturant of alcohol.

8. A process of producing a denaturant, which comprises treating oil containing sulphur bodies with sulphuric acid to form acid sludge, hydrolyzing the acid sludge to separate the oil from the acid, subjecting the oil to fractional distillation to separate therefrom a fraction having an end boiling point not substantially above 500° F. for use as a denaturant of alcohol, and treating the oil with alkali to remove substantially all mercaptans.

9. A process of producing a denaturing material, which comprises subjecting a petroleum oil containing sulphur to treatment with sulphuric acid to form an acid sludge, then subjecting the acid sludge to hydrolysis by the addition of water and digestion under heat to form oil and acid layers, separating the oil layer and subjecting the same to fractional distillation to fractionate therefrom a portion having suitable boiling points for use as a denaturant and possessing a sulphur content of between 2 and 30% sulphur.

10. A process of producing a denaturing material, which comprises subjecting a petroleum oil containing sulphur to treatment with sulphuric acid to form an acid sludge, then subjecting the acid sludge to hydrolysis by the addition of water and digestion under heat to form oil and acid layers, separating the oil layer and subjecting the same to fractional distillation to fractionate therefrom a portion having suitable boiling points for use as a denaturant and possessing a sulphur content of between 2 and 30% sulphur, and neutralizing the oil with caustic alkali to remove mercaptans.

11. A denatured alcohol containing oils derived from the acid sludge formed during the sulphuric acid treatment of hydrocarbon oil, said oils having a sulphur content of 2 to 30% and being substantially free of toxic bodies.

12. A denatured alcohol containing oils derived from the acid sludge formed during sulphuric acid treatment of hydrocarbon oil, said oils containing organic sulphur bodies and being substantially free of toxic bodies and having an end boiling point not appreciably above 500° F.

13. A denatured alcohol comprising alcohol and an admixture of refined volatile petroleum oil, and oils derived from the acid sludge formed during sulphuric acid treatment of hydrocarbon oil, said oils containing organic sulphur bodies and being substantially free from toxic bodies such as alkaloids.

14. A denatured alcohol comprising alcohol and an admixture of a liquid sulphur dioxide extract of a volatile petroleum oil, and oils derived from the sulphuric acid sludge formed during the sulphur acid treatment of hydrocarbon oil, said oils containing a material amount of sulphuric bodies and being substantially free of toxic bodies.

15. A denatured alcohol comprising alcohol and an admixture of a volatile aromatic hydrocarbon, and oils derived from the acid sludge formed during the sulphuric acid treatment of hydrocarbon oil, said oils containing organic sulphur bodies and being substantially free of toxic bodies, said admixture having an end boiling point not appreciably above 500° F.

16. A denaturant for alcohol, comprising oils derived from the sulphuric acid treatment of low boiling point fractions in petroleum, said denaturant oils containing an appreciable quantity of organic sulphur bodies, said denaturant oils being rectified from the high boiling point tar resulting from the sulphuric acid treatment, and having an end boiling point not substantially above 500° F. and free of alkaloids, said denaturant containing a low boiling point diluent oil consisting mainly of unsaturated constituents.

17. A denaturant for alcohol, comprising oils derived from the sulphuric acid treatment of low boiling point fractions in petroleum, said denaturant oils containing an appreciable quantity of organic sulphur bodies, said denaturant oils being rectified from the high boiling point tar resulting from the sulphuric acid treatment, and having an end boiling point not substantially above 500° F. and free of alkaloids, said denaturant including a diluent composed of a low boiling point aromatic oil obtained as a sulphur dioxide extract petroleum.

WILLIAM H. HAMPTON.